(No Model.)

G. E. KEPHART.
POISON AND FERTILIZER DISTRIBUTER.

No. 458,232. Patented Aug. 25, 1891.

Witnesses.
A. Ruppert,
H. A. Daniels

Inventor:
George E. Kephart
Per
Thomas P. Simpson
Atty

UNITED STATES PATENT OFFICE.

GEORGE E. KEPHART, OF TRADESVILLE, PENNSYLVANIA.

POISON OR FERTILIZER DISTRIBUTER.

SPECIFICATION forming part of Letters Patent No. 458,232, dated August 25, 1891.

Application filed April 18, 1891. Serial No. 389,488. (No model.)

*To all whom it may concern:*

Be it known that I, GEORGE E. KEPHART, a citizen of the United States, residing at Tradesville, in the county of Bucks and State of Pennsylvania, have invented certain new and useful Improvements in Poison or Fertilizer Distributers; and I do hereby declare the following to be a full, clear, and exact description of the invention, such as will enable others skilled in the art to which it appertains to make and use the same.

The special object of the invention is to make a device by which fertilizers or insect-poisons may be diluted with water and sprinkled over the rows of plants, the sprinklers being carried across a one-wheeled barrow, so as to allow the man and wheel to go between the rows while the liquid is sprinkled on the two adjacent rows.

Figure 1:
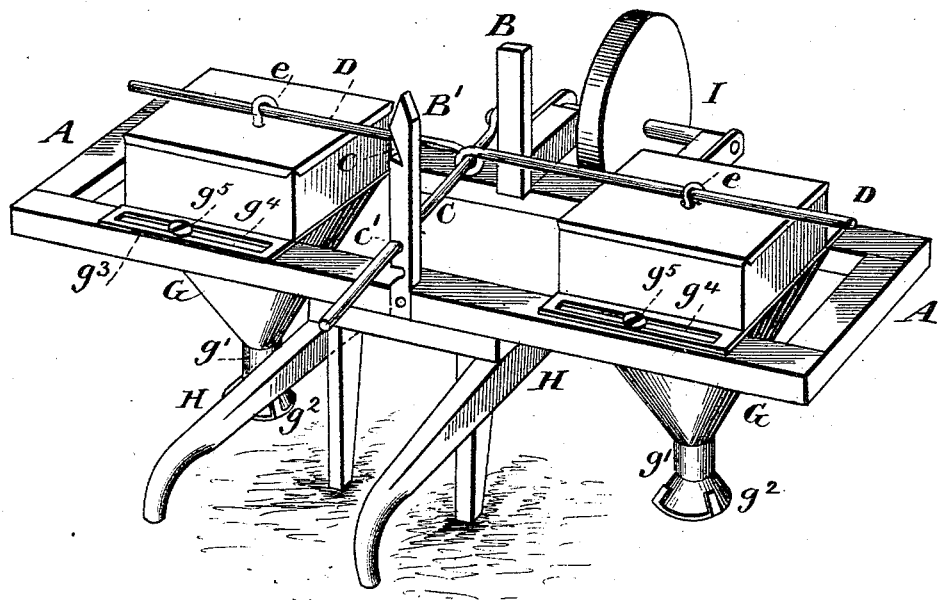
Figure 2:
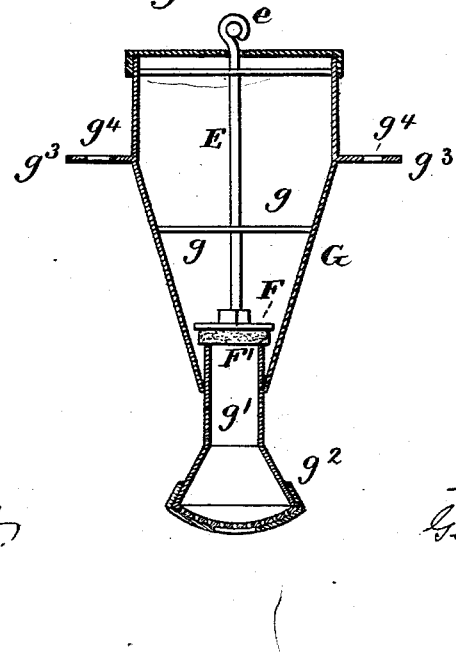

Figure 1 of the drawings is a perspective view showing the two sprinklers on the one-wheel barrow, and Fig. 2 a vertical cross-section of one of the sprinklers.

In the drawings, A represents a rectangular frame having at or near its middle the two uprights B B', the former serving as a fulcrum-post for the lever C, while the latter is notched reversely at $c\ c'$ to hold the free end of said lever up or down. This lever passes through an eye $d$ of the long rod D, so as to hold it at different altitudes, and this rod itself passes through the eyes $e$ of the valve-rods E. The valves F may thus be held water-tight in their seats F', or may be held open, so as to allow the liquid to pass from the main chamber $g$ of the sprinklers G through the necks $g'$ out at the perforations $g^2$.

The operator, standing between the handles of the barrow H, walks in the middle between two rows of plants and in line with his wheel I, while each sprinkler is arranged over one row of plants. At the start he lifts the lever C into the highest notch $c$, which opens the valves, and they remain open until he reaches the ends of the rows, when he places the lever in a notch $c'$, so as to fasten the valves in their seats while he turns to go between two new rows or replenishes his sprinklers with the solution. Each sprinkler has a horizontal flange $g^3$, with a slot $g^4$ on both sides, so that they may be adjusted on the screws $g^5$, which clamp them to the frame A, according to the distance of the rows apart.

What I claim as new, and desire to protect by Letters Patent, is—

The combination, with a one-wheel barrow and the frame having standards B B, of the lever C, pivoted to one of said standards and working in an upper or lower notch thereof, the rod D, having in the middle an eye for the lever, the rods E E, having an eye at the top and a valve at the lower end, and the sprinklers G G, having a bottom seat for the valve and below that perforations, all substantially as shown and described.

In testimony whereof I have affixed my signature in presence of two witnesses.

GEORGE E. KEPHART.

Witnesses:
WILLIAM J. KIRK,
JOHN J. DUNGAN.